United States Patent
Zhu et al.

(10) Patent No.: US 12,253,310 B2
(45) Date of Patent: Mar. 18, 2025

(54) PELLET FLUE GAS CIRCULATION AND WASTE HEAT UTILIZATION PROCESS AND SYSTEM THEREOF

(71) Applicant: Institute of Process Engineering, Chinese Academy of Sciences, Beijing (CN)

(72) Inventors: Tingyu Zhu, Beijing (CN); Wenqing Xu, Beijing (CN); Jun Xie, Beijing (CN); Chaoqun Li, Beijing (CN); Yixi Wang, Beijing (CN)

(73) Assignee: INSTITUTE OF PROCESS ENGINEERING, CHINESE ACADEMY OF SCIENCES (CN)

( * ) Notice: Subject to any disclaimer, the term of this patent is extended or adjusted under 35 U.S.C. 154(b) by 78 days.

(21) Appl. No.: 18/102,107

(22) Filed: Jan. 27, 2023

(65) Prior Publication Data
US 2023/0243586 A1    Aug. 3, 2023

(30) Foreign Application Priority Data
Jan. 29, 2022   (CN) .......................... 202210110071.1

(51) Int. Cl.
*F27B 7/36* (2006.01)
*F27D 15/02* (2006.01)
(Continued)

(52) U.S. Cl.
CPC .............. *F27B 7/362* (2013.01); *F27D 15/02* (2013.01); *F27D 17/004* (2013.01);
(Continued)

(58) Field of Classification Search
CPC ...... F27B 7/20; F27B 7/362; F27B 2007/365; F27D 15/02; F27D 17/004; F27D 17/008; Y02P 10/25
(Continued)

(56) References Cited

U.S. PATENT DOCUMENTS

2007/0178418 A1*  8/2007  Meyer ................... F27D 17/004
                                                                    432/14
2007/0239365 A1*  10/2007  Hanson ................. F27D 17/008
                                                                    702/22
(Continued)

FOREIGN PATENT DOCUMENTS

CN     109136545     1/2019
CN     109373767     2/2019
(Continued)

OTHER PUBLICATIONS

CN-109373767-A—Translation (Year: 2019).*
(Continued)

*Primary Examiner* — Steven B McAllister
*Assistant Examiner* — Benjamin W Johnson
(74) *Attorney, Agent, or Firm* — McDonald Hopkins LLC

(57) ABSTRACT

The present application discloses a pellet flue gas circulation and waste heat utilization process and a system thereof, which relates to the technical field of flue gas treatment. The system includes a grate, a rotary kiln, an annular cooler, and
(Continued)

ducts connecting each part. On the basis of not changing the existing process a flue gas circulation unit and intelligent control equipment are arranged additionally in the present application. The process is simple, and not only can ensure the parameter stability of the production system such as temperature, gas flow or gas pressure, but also can make full use of the low and medium temperature flue gas components and the waste heat, so as to achieve net zero waste gas discharging, energy saving and emission reduction.

1 Claim, 1 Drawing Sheet

(51) Int. Cl.
*F27D 17/00* (2006.01)
*F27B 7/20* (2006.01)

(52) U.S. Cl.
CPC .............. *F27D 17/008* (2013.01); *F27B 7/20* (2013.01); *F27B 2007/365* (2013.01); *Y02P 10/25* (2015.11)

(58) Field of Classification Search
USPC ......................................................... 432/105
See application file for complete search history.

(56) References Cited

U.S. PATENT DOCUMENTS

| 2016/0209031 A1* | 7/2016 | Lou | .......................... F23N 5/242 |
| 2018/0118617 A1* | 5/2018 | Omar | ....................... F23J 15/06 |

FOREIGN PATENT DOCUMENTS

| CN | 109373767 A | * | 2/2019 | ............. C22B 1/216 |
| CN | 209386821 | | 9/2019 | |
| CN | 110614025 | | 12/2019 | |
| CN | 210922235 | | 7/2020 | |
| CN | 211373267 | | 8/2020 | |
| CN | 113694704 A | * | 11/2021 | |

OTHER PUBLICATIONS

CN 113694704 A—Translation (Year: 2021).*
State Intellectual Property Office of People's Republic of China, Notification of First Office Action for Application No. 202210110071.1, report issue date Jul. 1, 2022 China.
State Intellectual Property Office of People's Republic of China, Notification of Second Office Action for Application No. 202210110071.1, report issue date Sep. 2, 2022 China.
State Intellectual Property Office of People's Republic of China, Notification to Grant for Application No. 20221011007.1 report issue date Dec. 2, 2022, China.

* cited by examiner

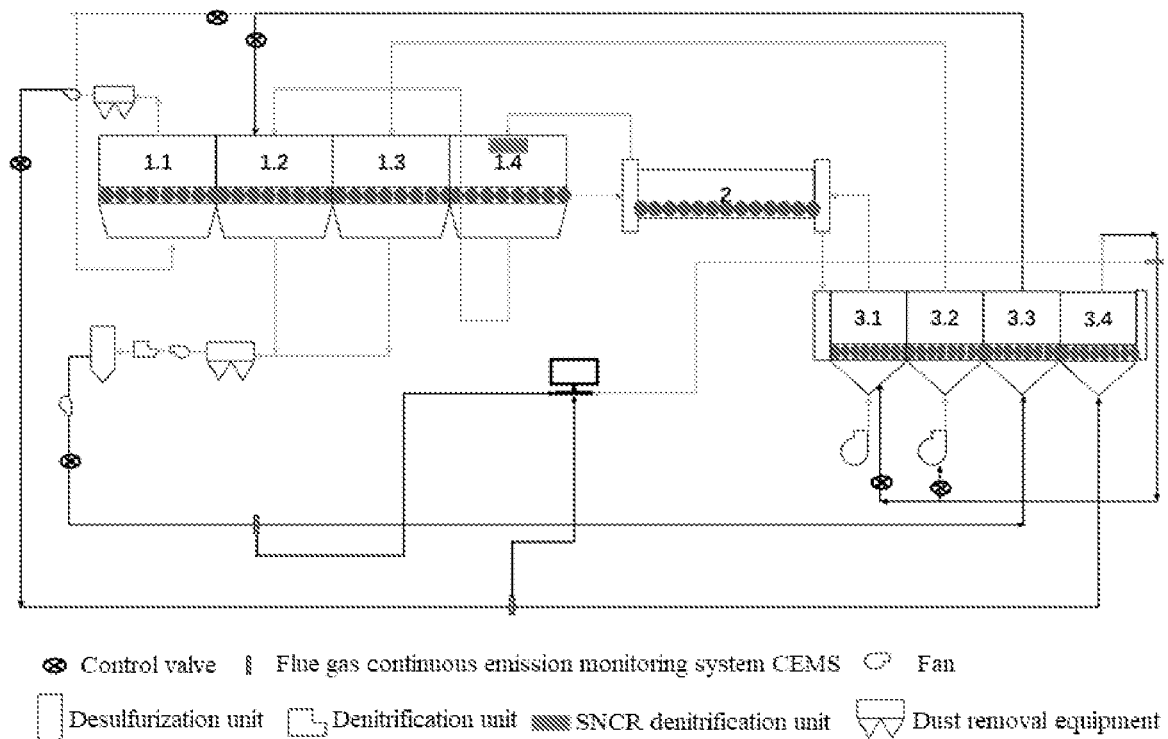

PELLET FLUE GAS CIRCULATION AND WASTE HEAT UTILIZATION PROCESS AND SYSTEM THEREOF

CROSS-REFERENCE TO RELATED APPLICATION(S)

This application claims priority to Chinese Patent Application No. 202210110071.1 filed Jan. 29, 2022, the disclosure of which is incorporated herein by reference in its entirety.

TECHNICAL FIELD

The present application relates to the technical field of flue gas treatment, and in particular to a pellet flue gas circulation and waste heat utilization process and a system thereof.

BACKGROUND

As an important charge for blast furnace ironmaking process, the pellet has many advantages such as high strength and good metallurgical properties. Compared with the sintering process, the pellet process has lower energy consumption and pollution load. Besides, the pellet is more suitable for the iron ore resource condition which is mainly concentrate. Therefore, as an iron ore pelletizing technology, the development of pellet is encouraged. With the development of the iron and steel industry, the production of pellet is gradually increasing year by year.

There are various production processes for pellets, and several major pellet roasting methods include shaft furnace roasting pellets, belt roaster roasting pellets, and grate-rotary kiln roasting pellets. The shaft furnace pellet technology is adopted the earliest, but developed slowly due to its inherent shortcomings such as uneven pellet mass, poor adaptability to raw materials, and hard mass production. At present, the pellet production is dominated by the grate-rotary kiln process in China, the output of which accounts for more than 60% of the total pellet production. Grate-rotary kiln pellet technology is a pellet process that includes grate drying, preheating raw pellets, rotary kiln consolidation, roasting pellets, and annular cooler cooling to obtain the finished pellets. The pellet produced by this technology is a high-quality blast furnace raw material with high iron content, good metallurgical properties, long-time storage and long-distance transportation capacity, and other commercialization advantages.

However, the pellet production process will discharge particulates, $SO_2$, $NO_x$, $CO_2$, CO, dioxin, fluoride, chloride, heavy metals and other pollutants, the component of the flue gas is complex, the pollutant concentration fluctuates greatly, the flue gas temperature changes in a wide range, and the oxygen content and moisture content are high. The grate-rotary kiln pellet production process produces a large amount of exhaust gas, resulting in high cost of exhaust gas treatment. The exhaust gas from the drying section and the first preheating section is not recycled, and the waste heat utilization degree of the hot exhaust gas is not enough. The exhaust gas from the blast drying section and the fourth cooling section is directly discharged into the atmosphere through the chimney. For each ton of the pellet produced, the heat taken away from the first preheating section accounts for more than 60% of the exhaust gas, and the exhaust gas emission reaches up to more than 1500 $m^3$ for per ton of pellet. Thus, the flue gas heat is wasted, the environment is polluted and the waste is caused. Currently, the flue gas treatment for sintered pellet does not achieve the expected result, and with the increasingly strict emission standards for air pollutants and ultra-low emission standards for pollutants in the steel industry, there is an urgent need for pellet roasting flue gas treatment. In order to save energy and reduce emissions, the exhaust gas and waste heat of pellet production must be recycled, based on the grate-rotary kiln pellet production process, and by using the characteristics of the system.

CN101592443B discloses a pellet production equipment waste heat internal-external circulation comprehensive recycling method and a hot air flow system thereof, which is mainly used for the grate-rotary kiln-annular cooler pellet production process. The waste heat recovery efficiency and waste heat utilization efficiency of pellet production are improved by internal circulation efficient recycling of high temperature pellet waste heat in the annular cooler, internal circulation efficient recycling of high temperature grate bed waste heat in the grate, external recycling of waste heat among the equipment, recycling of heat in the preheated drying section of the grate and preheating of pulverized coal to be burned in the rotary kiln.

CN213747933U discloses a grate-rotary kiln-annular cooler pellet flue gas circulation coupling treatment system. A specific flue gas from a transition preheating section of the grate is circulated, which means that a plurality of air boxes after the transition preheating section are divided the into a front section air box and a back section air box (according to the direction of the material) depending on different $NO_x$ contents in the flue gas, and the flue gas with high $NO_x$ content from the back section air box is circulated to a first annular cooling section. At the same time, the exhaust gas from the preheating section is subjected to non-heated SCR (Selective Catalytic Reduction) denitrification treatment.

CN213335588U discloses a pellet flue gas treatment system based on a one-time circulation inlet of a rotary kiln. A specific flue gas from a transition preheating section of a grate is circulated, and at the same time, the exhaust gas from the preheating section is subjected to non-heated SCR denitrification treatment. Besides, an SNCR-SCR (Selective Non-Catalytic Reduction-Selective Catalytic Reduction) coupling denitrification mathematical model control method is developed. The pellet flue gas is treated by adding a compound additive to the SNCR denitrification catalyst or by providing a new SNCR compound ammonia agent.

CN208742297U discloses a grate-rotary kiln pellet flue gas denitrification device, in which the rotary kiln is connected to the grate, and two sets of a multi-duct dust collector, a denitrification reactor and a heat resistant fan are connected and then arranged at two sides of the grate. When used, the multi-duct dust collector, the denitrification reactor and the heat-resistant fan are arranged in tandem to collectively perform denitrification on the flue gas at a second preheating section of the grate.

CN112728954A discloses a sintering-pellet system and an exhaust gas recycling system of the sintering-pellet process, in which an air-induced duct is arranged to combine the sintering process with the pellet process to comprehensively utilize the flue gas. However, in this patent, the waste gas, which is from two processes including the pellet process and the sintering process, is recycled, and thus different processes are crossed, resulting in complicated equipment setup.

CN101624647B discloses a pellet roasting production process with waste heat recycling and a system thereof, and the process includes three stages of raw pellet drying and preheating, raw pellet roasting and high temperature pellet cooling, in which the gas flow from a third cooling section in the high temperature pellet cooling stage is introduced into a blast drying section in the raw pellet drying and preheating stage as a heat source; the system includes a grate, a rotary kiln and an annular cooler connected in sequence, in which the annular cooler includes a first cooling section, a second cooling section and a third cooling section, and a fume hood of the third cooling section is connected to an air box circuit of a blast drying section through a multi-duct dust collector and an extractor fan. This process and its system make full use of thermal energy and reduce the environmental pollution of the exhaust gases.

CN207991270U discloses a grate hot-gas system, in which a preheating II section is divided into a front preheating II section and a back preheating II section. The mixed hot flue gas in the front preheating II section is conveyed to an extraction drying section through a hot-gas duct I, and the mixed hot flue gas in the back preheating II section is conveyed to a preheating I section through a hot air duct II. An annular cooler III section is connected to the air box of the blast drying section through a hot air duct III, and the annular cooler III section is connected to a upper hood of the blast drying section through a hot air duct IV, and two flow-induced holes are arranged in a partition wall between the annular cooler section II and the annular cooler III section. The heat from the grate is properly used and recycled. Not only is the cold air to be blended reduced in the system, but also the preheating I section is effectively reheated. Both the consumption of duct heating furnace fuel and the harmful gas emissions generated by combustion are reduced.

In conclusion, although there are various exhaust gas emission and $NO_x$ purification devices in the grate-rotary kiln-annular cooler pellet process at present, the existing process or equipment all needs to be improved for recycling the exhaust gas from the extraction drying and preheating drying section of the grate in the grate-rotary kiln-annular cooler pellet process. The cost is high and the process is complex. Additionally, the low and medium temperature exhaust gas from the blast drying section and the fourth annular cooling section is not utilized but is discharged in an unorganized manner, which not only poses pollution risks, but also wastes energy.

SUMMARY

The present application is to provide a pellet flue gas circulation and waste heat utilization process and a system thereof to solve the above problems in the prior art. On the basis of not changing the existing process, a flue gas circulation unit and intelligent control equipment are arranged additionally. The process is simple, and not only can ensure the parameter stability of the production system such as temperature, gas flow or gas pressure, but also can make full use of the low and medium temperature flue gas components and the waste heat, so as to achieve net zero waste gas discharging, energy saving and emission reduction.

The present application provides a pellet flue gas circulation and waste heat utilization system, including a grate, a rotary kiln and an annular cooler; in the pellet feeding direction, the grate includes a blast drying section, an extraction drying section, a first preheating section and a second preheating section in sequence, the annular cooler includes a first annular cooling section, a second annular cooling section, a third annular cooling section and a fourth annular cooling section in sequence, and a head end of the rotary kiln is connected to the second preheating section of the grate, and a tail end of the rotary kiln is connected to the first annular cooling section of the annular cooler.

An outlet of the first annular cooling section of the annular cooler is connected to an inlet of the rotary kiln through a duct, an outlet of the rotary kiln is connected to an inlet of the second preheating section of the grate through a duct, and an outlet of the second preheating section of the grate is connected to an inlet of the extraction drying section of the grate through a duct.

An outlet of the second annular cooling section of the annular cooler is connected to an inlet of the first preheating section of the grate through a duct.

An outlet of the third annular cooling section of the annular cooler is connected to inlets of the blast drying section and the extraction drying section of the grate through ducts, respectively.

Outlets of the extraction drying section and the first preheating section of the grate are connected to an inlet of the third annular cooling section of the annular cooler through ducts.

An outlet of the blast drying section of the grate is connected to an inlet of the fourth annular cooling section of the annular cooler through a duct.

An outlet of the fourth annular cooling section of the annular cooler is connected to inlets of the first annular cooling section and the second annular cooling section of the annular cooler through ducts, respectively.

Furthermore, a continuous flue gas emission monitoring system CEMS and a gas flow control valve are arranged in the ducts between the blast drying section and the fourth annular cooling section, between the extraction drying section and the first preheating section and the third annular cooling section, and between the fourth annular cooling section and the first annular cooling section and the second annular cooling section.

The continuous flue gas emission monitoring system CEMS can detect gas temperature, flow rate, gas pressure, concentration component and other parameters, transmit the detection signal to the computer control program directly, evaluate the situation according to the working conditions, and regulate the valve opening degree intelligently, so as to ensure that the temperature, flow rate and gas pressure of the gas in each section are stable when the process is carried out. For example, if the temperature of the second annular cooling section is higher than the normal value, the program will automatically reduce the valve opening degree of the circulating gas of the fourth annular cooling section and increase the cold air input to control the temperature. When the working conditions change, the system can be timely adjusted to a stable state by the air box and valves and continue to cycle.

The circulating gas flow and ratio can be intelligently regulated through the gas flow control valve, and the gas flow, temperature and concentration required by each section of the pellet production process can be kept stable.

A gas flow control valve is arranged in the duct between the third annular cooling section and the blast drying section and the extraction drying section.

Furthermore, dust removal equipment is arranged between the blast drying section and the fourth annular cooling section.

Dust removal equipment is also arranged between the extraction drying section and the first preheating section and the third annular cooling section.

The dust removal equipment is one or a combination of at least two of a cyclone dust collector, a cloth bag dust collector or an electric bag dust collector.

Furthermore, a desulfurization unit and a denitrification unit are further arranged in the duct from the extraction drying section and the first preheating section to the third annular cooling section.

The desulfurization unit is one or a combination of at least two of a circulating fluidized bed semi-dry desulfurization unit, an SDA desulfurization unit or a wet desulfurization unit; the denitrification system can be flexibly configured in various ways such as SCR denitrification, and low temperature ozone oxidation denitrification.

Furthermore, an SNCR system is arranged on the top of the second preheating section or in an inlet duct of the second preheating section.

Furthermore, an SCR system is arranged between the extraction drying section and the third annular cooling section, and a part of $NO_x$ can be removed by using Fe species in the pellet with no catalyst added.

The present application also provides a pellet flue gas circulation and waste heat utilization process, which is carried out based on the pellet flue gas circulation and waste heat utilization system.

Furthermore, 50%-100% of the flue gas from the blast drying section is introduced into the fourth annular cooling section after dust removal; the flue gas introduced into the first annular cooling section and the flue gas introduced into the second annular cooling section from the fourth annular cooling section have a ratio of 0:1-1:0.

The annular cooling sections generally extracts air to the annular cooling sections separately to cool the pellet, and the flue gas from the blast drying section has fewer pollutants and lower temperature, and can be introduced into the fourth annular cooling section after dust removal as cooling gas to cool the pellet, an introduction ratio can preferably be 50%-100%, and the use of air is reduced; the flue gas from the fourth annular cooling section is generally directly discharged into the atmosphere due to the lower temperature, and the heat is also directly dissipated. In the present application, the exhaust gas from the fourth annular cooling section is separately introduced into the first annular cooling section and the second annular cooling section as cooling gas with an introduction ratio of 0:1-1:0, which can reduce the exhaust gas emission and energy dissipation of this process system, and can increase the flue gas temperature of the first annular cooling section and the second annular cooling section, and because the flue gas from the first annular cooling section will enter the rotary kiln, the roasting crystallization of the pellet is improved and the pellet strength is enhanced. The flue gas of the second annular cooling section will enter the first preheating section to increase the preheating temperature, which is beneficial to the preheating of raw pellet and can improve the pellet strength. The flue gas from the extraction drying section and the first preheating section accounts for more than 60% of the total flue gas, and the purified flue gas can be introduced into the third annular cooling section as cooling gas, and the ratio of the gas introduced into the blast drying section and the extraction drying section from the third annular cooling section can be adjusted according to the working conditions; the gas source of the extraction drying section comes from the second preheating section, but because the temperature of the second preheating section is high, generally, cold air is required to blend into the flue gas to adjust the temperature; in the present application, the gas from the third annular cooling section is introduced into the extraction drying section instead of cold air, which saves the use of cold air and makes full use of the heat of the gas in the third annular cooling section, appropriately raises the temperature of the extraction drying section to facilitate the evaporation of moisture in the raw pellet, and at the same time raises the temperature of the mixed flue gas from the extraction drying section and the first preheating section to reduce the heat supplement of the subsequent SCR denitrification system.

Furthermore, the flue gas from the blast drying section after dust removal has a temperature of 80-150° C., such as 110° C., 120° C., 130° C. or 150° C.; the flue gas from the extraction drying section and the first preheating section after desulfurization and denitrification has a temperature of 100-200° C., such as 120° C., 130° C., 150° C., 160° C. or 180° C.; the flue gas introduced into the first annular cooling section and the second annular cooling section from the fourth annular cooling section has a temperature of 100-200° C., such as 120° C., 130° C., 150° C. or 160° C.; the flue gas introduced into the blast drying section and the extraction drying section from the third annular cooling section has a temperature of 250-350° C., such as 250° C., 280° C., 300° C., 320° C. or 350° C.

Furthermore, the flue gas from the blast drying section after dust removal has an oxygen content of 17-20%, such as 17%, 17.5%, 17.8%, 18% or 19%; the flue gas from the extraction drying section and the first preheating section after desulfurization and denitrification has an oxygen content of 12-18%, such as 17%, 17.5%, 17.8% or 18%; the flue gas introduced into the blast drying section and the extraction drying section from the third annular cooling section has an oxygen content of 17-20%; the flue gas introduced into the first annular cooling section and the second annular cooling section from the fourth annular cooling section has an oxygen content of 17-20%, such as 17%, 17.5%, 17.8%, 18% or 19%.

When the temperature of the circulating flue gas is higher than the target temperature, a waste heat recovery unit can be arranged in the grate and the annular cooler to recover the excess heat and then the flue gas can be processed or circulated.

The present application discloses the technical effects below.

In the present application, the flue gas from the blast drying section after dust removal is introduced into the fourth annular cooling section; the net flue gas (with a high oxygen content) from the extraction drying section and the first preheating section after desulfurization and denitrification is conveyed to the third annular cooling section, the flue gas from the third annular cooling section is separately introduced into the blast drying section and the extraction drying section for recycling, and the flue gas from the fourth annular cooling section is introduced into the first annular cooling section or the second annular cooling section for recycling as blending gas. A continuous flue gas emission monitoring system CEMS and a gas flow control valve are arranged in the flue gas ducts, which can intelligently regulate the circulating flue gas flow according to the actual working conditions and keep stable flow and pressure for the system. By using this system, the flue gas emission is reduced during the pellet production process, the temperature of the drying preheating section is increased, the pellet quality and flue gas temperature are improved, and the energy input is reduced in the subsequent desulfurization and denitrification process. By recycling the flue gas during the production process, the remaining heat and gas component are fully utilized, the air input is significantly reduced in the annular cooling section and the exhaust gas discharged into the environment is reduced, and the pellet quality is improved and energy consumption is reduced.

The characteristics of the pellet production is fully considered in the present application, the flue gas from the extraction drying section and first preheating section in the existing process is fully and effectively recycled in the third annular cooling section, which replaces the cold air to cool the pellet and reduces the cold air input and energy consumption of the process. Meanwhile, the flue gas needed to be treated by the corresponding pellet waste gas emission treatment system is reduced by more than 50%.

By recycling the exhaust gas from the blast drying section and the fourth annular cooling section in the annular cooling section internally, the temperature and flow of hot air introduced into the rotary kiln is increased, the flame temperature of the rotary kiln is reduced and the amount of thermal $NO_x$ generated is reduced; meanwhile, the temperature of the preheating section and the roasting section can be increased, thus improving the drying degree and drying intensity of the raw pellet, avoiding the waste of heat and reducing the emission of exhaust gas and environmental pollution; the flue gas from the extraction drying section and the first preheating section has increased temperature, and if an SCR system is arranged in the extraction drying section, the temperature can reach the suitable range for SCR denitrification with no need for additional heat, saving energy.

A part of the flue gas from the third annular cooling section is introduced into the extraction drying section and thus the amount of the cold air needed to be blended is reduced, and the energy input of the process system is reduced.

Based on the existing process equipment, a flue gas circulation unit and intelligent control equipment are arranged additionally in the present application, so that the exhaust gas and heat can be recycled internally in the pellet process, and the discharging flue gas can be fully used and the amount of cold air required by the system is significantly reduced. The process of the present application is simple and has small investment, and meanwhile, avoids equipment waste and duct waste caused by equipment modification or process crossing.

BRIEF DESCRIPTION OF DRAWINGS

In order to more clearly illustrate the technical solutions in embodiments of the present application or in the prior art, the accompanying drawing used in the embodiments will be briefly described below. Apparently, the accompanying drawing below is only an embodiment of the present application, and other accompanying drawings may be obtained based on this one without creative efforts to those skilled in the art.

FIG. 1 is a structure diagram of a pellet flue gas circulation and waste heat utilization system in Example 1 of the present application.

REFERENCE LIST 1.1 blast drying section
1.2 extraction drying section
1.3 first preheating section
1.4 second preheating section
2 rotary kiln
3.1 first annular cooling section
3.2 second annular cooling section
3.3 third annular cooling section
3.4 fourth annular cooling section

DETAILED DESCRIPTION

Various exemplary embodiments of the present application will be described in detail, and this detailed description should not be regarded as a limitation of the present application, but a more detailed description of certain aspects, features and embodiments of the present application.

It is to be understood that the terms described in the present application are intended to describe particular embodiments only and are not intended to limit the present application. Additionally, with respect to the numerical range in the present application, it is to be understood that each value between the upper and lower limits of the range is specifically disclosed. Each listed value, each value within the listed range, and every smaller range between any other listed values or between any values within the listed range are all included in the present application. The upper and lower limits of these smaller ranges may be independently included or excluded from the scope.

Unless otherwise indicated, all technical and scientific terms used herein have the same meaning as those commonly understood by those skilled in the art. Although only preferred methods and materials are described in the present application, any methods and materials similar or equivalent to those described herein may also be used in the implementation or testing of the present application. All documents referred to in this specification are incorporated by reference for disclosing and describing the methods and/or materials associated with said documents. In the case of conflict with any incorporated documents, the contents of this specification shall prevail.

Various improvements and variations may be made to specific embodiments of the specification of the present application without departing from the scope or spirit of the present application, which is apparent to those skilled in the art. Other embodiments obtained from the specification of the present application will be apparent to those skilled in the art. The specification and embodiments of the present application are exemplary only.

The terms "comprises", "includes", "has", "contains", etc., as used herein, are open-ended terms, which means "inclusive but not limited to".

Example 1

A structure diagram of a pellet flue gas circulation and waste heat utilization system in an embodiment of the present application is shown in FIG. 1. The system includes a grate, a rotary kiln and an annular cooler; in the pellet feeding direction, the grate includes a blast drying section 1.1, an extraction drying section 1.2, a first preheating section 1.3 and a second preheating section 1.4 in sequence, the annular cooler includes a first annular cooling section 3.1, a second annular cooling section 3.2, a third annular cooling section 3.3 and a fourth annular cooling section 3.4 in sequence, and a head end of the rotary kiln 2 is connected to the second preheating section 1.4 of the grate, and a tail end of the rotary kiln 2 is connected to the first annular cooling section 3.1 of the annular cooler.

An outlet of the first annular cooling section 3.1 of the annular cooler is connected to an inlet of the rotary kiln 2 through a duct, an outlet of the rotary kiln 2 is connected to an inlet of the second preheating section 1.4 of the grate through a duct, and an outlet of the second preheating section 1.4 of the grate is connected to an inlet of the extraction drying section 1.2 of the grate through a duct.

An outlet of the second annular cooling section 3.2 of the annular cooler is connected to an inlet of the first preheating section 1.3 of the grate through a duct.

An outlet of the third annular cooling section 3.3 of the annular cooler is connected to inlets of the blast drying section 1.1 and the extraction drying section 1.2 of the grate through ducts, respectively.

Outlets of the extraction drying section 1.2 and the first preheating section 1.3 of the grate are connected to an inlet of the third annular cooling section 3.3 of the annular cooler through ducts.

An outlet of the blast drying section 1.1 of the grate is connected to an inlet of the fourth annular cooling section 3.4 of the annular cooler through a duct.

An outlet of the fourth annular cooling section 3.4 of the annular cooler is connected to inlets of the first annular cooling section 3.1 and the second annular cooling section 3.2 of the annular cooler through ducts, respectively.

A continuous flue gas emission monitoring system CEMS and a flow control valve are arranged in the ducts between the blast drying section 1.1 and the fourth annular cooling section 3.4, between the extraction drying section 1.2 and the first preheating section 1.3 and the third annular cooling section 3.3, and between the fourth annular cooling section 3.4 and the first annular cooling section 3.1 and the second annular cooling section 3.2.

Dust removal equipment is further arranged between the blast drying section 1.1 and the fourth annular cooling section 3.4. The dust removal equipment is a cyclone dust collector.

A desulfurization unit and a denitrification unit are further arranged in the duct from the extraction drying section 1.2 and the first preheating section 1.3 to the third annular cooling section 3.3. The desulfurization unit is a circulating fluidized bed semi-dry desulfurization unit; the denitrification system is SCR denitrification.

An SNCR system is arranged on the top of the second preheating section 1.4.

The pellet flue gas circulation and waste heat utilization process is carried out based on the above system. The flue gas from the blast drying section 1.1 is introduced into the fourth annular cooling section 3.4 after dust removal; the net flue gas (with a high oxygen content) from the extraction drying section 1.2 and the first preheating section 1.3 after desulfurization and denitrification is introduced into the third annular cooling section 3.3, the flue gas from the third annular cooling section 3.3 is introduced into the blast drying section 1.1 and the extraction drying section 1.2, and the flue gas from the fourth annular cooling section 3.4 is introduced into the first annular cooling section 3.1 and the second annular cooling section 3.2 as blending gas.

When the grate is working, the blast drying section has a flue gas temperature range of 200-300° C., the extraction drying section has a flue gas temperature range of 300-400° C., the first preheating section has a flue gas temperature range of 550-650° C., and the second preheating section has a flue gas temperature range of 900-1000° C.; the rotary kiln has a roasting temperature of 1250-1350° C., the first annular cooling section is 1100° C., the second annular cooling section is 850° C., the third annular cooling section is 350° C., and the fourth annular cooling section is less than or equal to 180° C.; the temperature may have fluctuations depending on working conditions. The oxygen content is in the range of 14-21%.

50%-100% of the flue gas from the blast drying section 1.1 is introduced into the fourth annular cooling section 3.4 after dust removal; the net flue gas from the extraction drying section 1.2 and the first preheating section 1.3 after desulfurization and denitrification has a ratio of 10-100%, i.e. 0.1:1-1:0; the gas flow introduced into the first annular cooling section 3.1 and the gas flow introduced into the second annular cooling section 3.2 from the fourth annular cooling section 3.4 have a ratio of 0-100%, i.e. 0:1-1:0.

The flue gas from the blast drying section 1.1 after dust removal has a temperature of 80-150° C.; the net flue gas from the extraction drying section 1.2 and the first preheating section 1.3 after desulfurization and denitrification has a temperature of 100-200° C.; the flue gas from the third annular cooling section 3.3 has a temperature of 250-350° C. when introduced into the blast drying section 1.1 and the extraction drying section 1.2; the exhaust gas introduced into the first annular cooling section 3.1 and the second annular cooling section 3.2 from the fourth annular cooling section 3.4 has a temperature of 100-200° C.

The flue gas from the blast drying section 1.1 after dust removal has an $O_2$ content of 17-20%; the net flue gas ($SO_2$: 35 mg/Nm$^3$, $NO_x$: 50 mg/Nm$^3$, particulate: 10 mg/Nm$^3$) from the extraction drying section 1.2 and the first preheating section 1.3 after desulfurization and denitrification has an $O_2$ content of 12-18%; the flue gas from the third annular cooling section 3.3 has an $O_2$ content of 17-20%; the exhaust gas introduced into the first annular cooling section 3.1 and the second annular cooling section 3.2 from the fourth annular cooling section 3.4 has an $O_2$ content of 17-20%.

The above example is only the preferred embodiment of the present application and are not intended to limit the present application, and various variations and improvements, which can be made to the technical solutions of the present application by those skilled in the art without departing from the spirit of the present application, shall fall within the protection scope defined by the appended claims of the present application.

What is claimed is:

1. A pellet flue gas circulation and waste heat utilization process, which is carried out with a pellet flue gas circulation and waste heat utilization system;

wherein the pellet flue gas circulation and waste heat utilization system comprises a grate, a rotary kiln and an annular cooler; in a pellet feeding direction, the grate comprises a blast drying section, an extraction drying section, a first preheating section and a second preheating section in sequence, the annular cooler comprises a first annular cooling section, a second annular cooling section, a third annular cooling section and a fourth annular cooling section in sequence, and a head end of the rotary kiln is connected to the second preheating section of the grate, and a tail end of the rotary kiln is connected to the first annular cooling section of the annular cooler;

an outlet of the first annular cooling section of the annular cooler is connected to an inlet of the rotary kiln through a duct, an outlet of the rotary kiln is connected to an inlet of the second preheating section of the grate through a duct, and an outlet of the second preheating section of the grate is connected to an inlet of the extraction drying section of the grate through a duct;

an outlet of the second annular cooling section of the annular cooler is connected to an inlet of the first preheating section of the grate through a duct;

an outlet of the third annular cooling section of the annular cooler is connected to inlets of the blast drying section and the extraction drying section of the grate through ducts, respectively;

outlets of the extraction drying section and the first preheating section of the grate are connected to an inlet of the third annular cooling section of the annular cooler through ducts;

an outlet of the blast drying section of the grate is connected to an inlet of the fourth annular cooling section of the annular cooler through a duct;

an outlet of the fourth annular cooling section of the annular cooler is connected to inlets of the first annular cooling section and the second annular cooling section of the annular cooler through ducts, respectively;

wherein the process comprises preforming continuous flue gas emission monitoring in the ducts between the blast drying section and the fourth annular cooling section, between the extraction drying section and the first preheating section and the third annular cooling section, and between the fourth annular cooling section and the first annular cooling section and the second annular cooling section;

wherein a control valve is arranged in the ducts between the blast drying section and the fourth annular cooling section, between the extraction drying section and the first preheating section and the third annular cooling section, and between the fourth annular cooling section and the first annular cooling section and the second annular cooling section;

wherein in the pellet flue gas circulation and waste heat utilization process, 50%-100% of the flue gas from the blast drying section is introduced into the fourth annular cooling section after dust removal; the flue gas introduced into the first annular cooling section and the flue gas introduced into the second annular cooling section from the fourth annular cooling section have a ratio of 0:1-1:0;

wherein the flue gas from the blast drying section after dust removal has a temperature of 80-150° C.; the flue gas from the extraction drying section and the first preheating section after desulfurization and denitrification has a temperature of 100-200° C.; the flue gas introduced into the first annular cooling section and the second annular cooling section from the fourth annular cooling section has a temperature of 100-200° C.; the flue gas introduced into the blast drying section and the extraction drying section from the third annular cooling section has a temperature of 250-350° C.;

wherein the flue gas from the blast drying section after dust removal has an oxygen content of 17-20%; the flue gas from the extraction drying section and the first preheating section after desulfurization and denitrification has an oxygen content of 12-18%; the flue gas introduced into the blast drying section and the extraction drying section from the third annular cooling section has an oxygen content of 17-20%; the flue gas introduced into the first annular cooling section and the second annular cooling section from the fourth annular cooling section has an oxygen content of 17-20%;

wherein dust removal equipment is further arranged between the blast drying section and the fourth annular cooling section;

wherein a desulfurization unit is further arranged in the duct from the extraction drying section and the first preheating section to the third annular cooling section;

performing denitrification in the duct from the extraction drying section and the first preheating section to the third annular cooling section;

performing SNCR at a top of the second preheating section or in an inlet duct of the second preheating section; and performing SCR between the extraction drying section and the third annular cooling section.

* * * * *